United States Patent
Meppelink et al.

[11] Patent Number: 5,846,646
[45] Date of Patent: Dec. 8, 1998

[54] ANTI-STATIC COATED VENETIAN BLIND SLAT AND METHOD OF PREPARATION THEREOF

[75] Inventors: Randall J. Meppelink, Zeeland, Mich.; Paul A. Renault, San Francisco, Calif.; Charles Robert Wolfe, Palo Alto, Calif.; Sandra K. Young, Los Gatos, Calif.

[73] Assignee: Levolor Corporation, Sunnyvale, Calif.

[21] Appl. No.: 778,509

[22] Filed: Jan. 3, 1997

Related U.S. Application Data

[63] Continuation of Ser. No. 369,268, Jan. 5, 1995, abandoned, which is a continuation of Ser. No. 958,063, Oct. 7, 1992, abandoned.

[51] Int. Cl.$^6$ ............................. B32B 5/16; E06B 9/26
[52] U.S. Cl. .................. 428/328; 160/166.1; 160/178.1; 160/236; 427/327; 427/407.1; 427/408; 427/409; 427/419.1; 427/419.2; 428/330; 428/409; 428/543
[58] Field of Search ................................. 428/328, 330, 428/409, 457, 543; 160/166.1, 178.1, 236; 427/322, 327, 402, 407.1, 408, 409, 419.1, 419.2

[56] References Cited

U.S. PATENT DOCUMENTS

| | | | |
|---|---|---|---|
| 3,793,931 | 2/1974 | Wild | 98/95 |
| 4,790,226 | 12/1988 | Tsuchida | 83/208 |
| 5,100,732 | 3/1992 | Benefiel | 428/457 |

FOREIGN PATENT DOCUMENTS

| | | |
|---|---|---|
| 0 134 551 | 3/1985 | European Pat. Off. . |
| 0134551A3 | 3/1985 | European Pat. Off. . |
| 2138812 | 3/1972 | Germany . |
| 8437398 | 3/1985 | Germany . |

OTHER PUBLICATIONS

"Specialty Spec–Stat", Specialty Coatings Company, Inc., Elk Grove Village, Illinois, Sep. 1988, two pages.

The Spec–Line of Static Dissitative Coatings, Specialty Coatings Company, Inc., Elk Grove Village, Illinois, Sep. 1988, pp. 1–3.

A New Family of Conductive Fillers, Stan–Stat, Magnesium Elektron, Inc. Flemington, New Jersey. Oct. 1988, four pages.

"The Industrial Coating" No. 94 published Sep. 15, 1988 by Asahi–Okuma Sangyo Co., Ltd., Japan.

"The Industrial Coating" No. 106 published Sep. 15, 1990 by Asahi–Okuma Sangyo Co., Ltd., Japan.

*Primary Examiner*—H. Thi Le
*Attorney, Agent, or Firm*—Foley & Lardner

[57] ABSTRACT

A venetian blind slat or coil of venetian blind slat substrate, such as aluminum, is first coated with a conductive primer. An anti-static conductive coated is applied thereover. The resultant coated finished blind slat and its associated spaced horizontal slats have sufficient conductivity to resist airborne dust particle accumulation with reductions in dust accumulation of from 36% to about 82% being attained, as compared to colored paint insulative coating on standard venetian blinds. An inorganic, inert conductive additive such as stannous oxide is employed in the anti-static conductive coating, resulting in coating conductivities of less than $10^6$ ohms per square and, in a preferred embodiment, from about 10 ohms per square to $10^5$ ohms per square.

24 Claims, 3 Drawing Sheets

ANTI-STATIC COATED VENETIAN BLIND SLAT AND METHOD OF PREPARATION THEREOF

This is a File Wrapper continuation of application Ser. No. 08/369,268, filed Jan. 5, 1995, abandoned, which is a File Wrapper continuation of application Ser. No. 07/958,063 filed Oct. 7, 1992, abandoned.

BACKGROUND OF THE INVENTION

This invention relates to a specialized coating for venetian blind slats. More particularly, the invention is directed to a coating which has sufficient anti-static characteristics so as create a coated blind slat which resists the attraction of surrounding airborne dust particles and resists dust accumulations and to a venetian blind slat coated with the anti-static coating.

One of the perennial and constant problems with venetian blinds has been the tendency of dust particles to settle on and build up upon the blind slats particularly on slats which are in a horizontal "open" position with respect to the blind bottom rail. Further, due to the environment of the blind where electrical charges may be present and particular atmospheric conditions are present, the airborne dust particles are actually attracted to the slat surfaces. The phenomenon of electrostatic discharge (ESD) has been controlled in various work places by providing for air ionization and subsequent airborne particle collection or devices which charge a surface with charges of opposite polarity or which ground surface charges. Such control means are quite expensive and are totally impractical for generally low-cost venetian blinds sold for home and office use. Color coatings which have been applied to venetian blind slats generally are of an insulating nature.

In certain industries, manufacturing and assembly areas have "clean room" environments provided by extensive filtering of the ambient air to remove particulate contamination. Materials of construction and manufacturing are also carefully selected in view of the danger of static discharge to advanced technology products. Also used in "clean room" environments are anti-static paints for aluminum panels making up the room enclosure. Again these special techniques cannot be applied to the normal home and office environment.

While special cleaning tools have been developed for removing dust from the slats of venetian blinds the electrostatic attraction of many slats attracting airborne particles is quite strong and dust build-up recommences quickly after slat cleaning.

U.S. Pat. No. 3,793,931 (1974) at Col. 4, lines 26–27, discloses without further explanation, and in the context of a forced air dual-window pane compartment with a shutter therebetween, slats of the shutter "preferably formed of an anti-static material".

BRIEF SUMMARY OF THE INVENTION

Notwithstanding the long existence of the dust problem on venetian blinds and the existence of anti-static paints for use in non-analogous industries as set forth above, the inventors hereof are unaware of any prior anti-dust coatings placed on the slats of venetian blinds. Venetian blinds are made in a very extensive number of colors and finishes, the finishes being placed on a variety of metal, wood and plastic slat substrates. Due to the competitiveness and price-consciousness aspect of the window blind business, it is considered desirable that any paint or coating operation on the millions of linear feet of slat production in a typical blind line employ a so-called "two-pass" production system. It has been found that in order to achieve dust reduction levels of from about 36% to about 82% that a coating having a sheet resistivity less than $10^6$ ohms per square is necessary to obtain such reductions. Techniques for measuring the level of "dust resistance" have been developed involving either direct particle counting on the slat surface or by weighing the accumulated particles.

In the preferred form of the invention a venetian blind slat having a metal, for example aluminum or steel, or non-conductive base or substrate such as wood or polyvinylchloride (PVC) plastic, has its exterior surfaces covered by an anti-static conductive coating including an inorganic, inert conductive additive with a coating thickness of from about 0.004 mm to about 0.025 mm. A conductive primer can be employed upon which the anti-static conductive coating is applied, if a primer is required for the desired coating color.

The present invention relates to a method for making a dustless blind (defined as one having at least about 35% less dust than a comparable untreated blind slat) involving the coating of a blind slat with a conductive coating material in the nature of paint. The method comprises applying a coating of this invention of a thickness of from about 0.004 mm to about 0.025 mm to the slat material followed by drying/curing of the coated slat or slat material at a temperature of from 180° C. to 300° C. for about 5–60 seconds. An anti-static conductive coating suitable for use in this invention is a composition of matter having a surface sheet resistance less than $10^6$ ohms per square, preferably less than about $10^5$ ohms per square.

The invention also relates to a blind slat and a series of blind slats making up an overall blind, each slat having a coating of a thickness of from about 0.004 mm to about 0.025 mm and having a surface sheet resistance less than $10^6$ ohms per square.

DETAILED DESCRIPTION

The present invention comprises a venetian blind slat comprising a metal or non-conductive slat substrate coated with an anti-static conductive coating and a method for preparing coated blind slats.

In the preferred form of the invention a venetian blind slat having a metal, for example aluminum or steel, or non-conductive base or substrate such as wood or polyvinylchloride (PVC) plastic, has its exterior surfaces covered by an anti-static conductive coating including an inorganic, inert conductive additive with a coating thickness of from about 0.004 mm to about 0.025 mm. In same embodiments, a conductive primer is employed upon which the anti-static conductive coating is applied when use of a primer for lighter colors is required.

The blind slat of the present invention may be prepared from any slat substrate but preferably utilizes an aluminum substrate as is conventionally used in the venetian blind manufacturing industry. When so-called mini blinds are being produced the blind slats have a nominal width of 1 inch (2.54 cm) and a thickness of 0.17 mm. The substrate is purchased by the blind manufacturer in the form of an about 3000 foot (915 meter) coil. The coil is then cut into 2.54 cm wide strips which are passed through a first blade-type coating station where a conductive primer coat is coated on the entire periphery of substrate being passed through the station and dried downstream. A primer coat may not be required depending on the color of the coating. If the primer coat is not required, the primer paint step is skipped. Briefly, light or pale colors require a primer if applied to a dark slat. In a second blade-type coating station downstream from the first station, an anti-static conductive coating is applied and then dried/cured at a downstream location.

Venetian blinds, as is well known, comprise a headrail, a series of tiltable spaced horizontal slats and a bottom rail with tilt ladder cross-pieces supporting the slats and draw cords extending through slat apertures for raising and lowering the blind slats and bottom rail.

Figure 5:
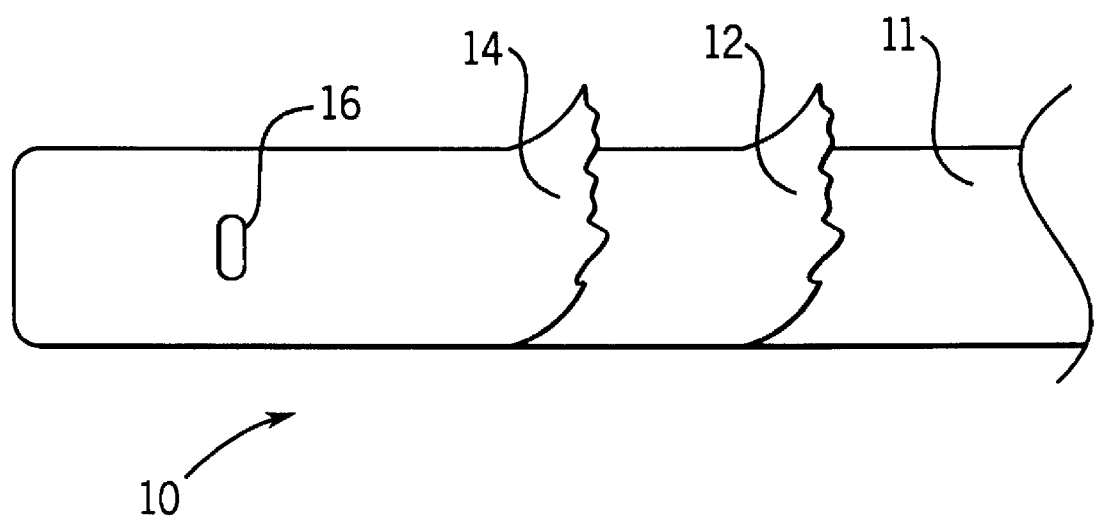
FIG. 5 is a perspective peeled-away view of a blind slat portion showing a conductive primer coat and an anti-static conductive color coating.

The present invention is directed to a slat(s) which resist dust accumulation and are therefore dust resistant. FIG. 5 illustrates a slat 10 having an aluminum, normally slightly curved substrate 11, a conductive primer coat 12 partially peeled away for illustration purposes, an anti-static conductive coating 14 also peeled away and a rout hole 16 at each end (one shown) through which a draw cord (not shown) is passed in an assembled blind.

The anti-static conductive coating for a dust resistant blind slat surface of this invention has a conductivity such that a tendency of the resultant coated slat to attract and accumulate airborne dust particles is minimized. Preferably, the coating provides a coated slat with a surface sheet resistance less than $10^6$ ohms per square, preferably less than about $10^5$ ohms per square.

The invention also relates to a blind slat and a series of blind slats making up an overall blind, each slat having a coating of a thickness of from about 0.004 mm to about 0.025 mm and having a surface sheet resistance less than $10^6$ ohms per square, preferably less than about $10^5$ ohms per square.

Anti-static coatings are made by mixing an inert inorganic conductive filler with a standard paint formulation. Because the filler is inert, the filler does not interfere with the resin system. Therefore, the filler can be dispersed in a paint formulation without having to adjust the chemistry of the resin system. Anti-static conductive coatings formulated in a wide variety of resin systems such as acrylics, vinyls, urethanes, epoxies, ethylene glycols and blends thereof, may be utilized in accordance with the present invention.

Paint formulations generally include (a) a resin system which acts as a binder; (b) a solvent system in which the resin is dissolved or dispersed; and (c) a conventional colored pigment such as titanium dioxide or carbon black or a dye.

The filler is an inert, inorganic, conductive material. Preferably the filler is a magnesium oxide, a tin oxide, a zinc oxide, a magnesium carbonate-containing magnesium oxide, zinc carbonate-containing zinc oxide, or a tin carbonate-containing tin oxide. Most preferably the filler is a tin oxide. Reactive fillers can also be used, but may require reformulation of the paint chemistry.

The amount of the filler added is sufficient to provide the anti-static conductive coating with a conductivity such that a tendency of the resultant coated slat to attract and accumulate airborne dust particles is minimized. Preferably, the filler is present in an amount sufficient to provide a coating having a resistivity less than $10^6$ ohms per square, more preferably less than about $10^5$ ohms per square. In a preferred embodiment, about 20 to about 60, more preferably about 30 to about 40, weight percent of the filler based on the dry weight of the coating is added. Smaller or larger amounts of the filler can also be used. The smaller the amount of the filler, the smaller the effect on the smoothness and the mechanical properties of the coatings. However, the larger the amount of the filler, the greater the conductivity of the coating.

Conductive fillers are available commercially from a number of sources including Magnesium Elektron Inc. (Flemington, N.J.). The coatings can be added to paint formulations from manufacturers such as Morton International, Inc. (Chicago, Ill.) and Akzo Coatings, Inc. (a subsidiary of Akzo Chemical Corporation, Chicago, Ill.). In addition, anti-static coatings are available from Specialty Coatings Company (Elk Grove Village, Ill.).

Anti-static conductive coatings are typically prepared by dispersing the filler in the paint formulation using typical paint manufacturing equipment such as colloid mills, high shear dispersers, mixers, metering, pumping and filtration equipment. The physical property evaluations including gloss, flex testing, mar resistance, pencil hardness, mek (methyl ethyl ketone) resistance, and film thickness, and electrical resistivity.

The primer is of a similar formulation except that the primer contains a reduced amount of the pigment or dye and is translucent. The primer may also include a reduced amount of the resin system, providing a reduced viscosity. In a most preferred embodiment, a coating which is commercially available from Specialty Coatings Company, Elk Grove Village, Ill. and is sold under the tradename SPEC-STAT® is used.

The present invention also relates to a method for making a dustless blind (defined as one having at least about 35% less dust than a comparable untreated blind slat) involving the coating of a blind slat with a conductive coating material in the nature of paint. The method comprises applying a coating of this invention of a thickness of from about 0.004 mm to about 0.025 mm to a slat material followed by drying/curing of the coated slat or slat material at a temperature of from 180° C. to 300° C. for about 5–60 seconds. If a primer is required for a desired coating color, the primer is applied prior to the paint and dried at a temperature of from 180° C. to 300° C. for about 5–60 seconds.

The following examples illustrate various embodiments of the anti-static conductive coatings used to coat venetian blind slats.

EXAMPLE 1

The primer designated Specialty code number 657-1-W-1158A (available from Specialty Coatings Company, Elk Grove Village, Ill. and sold under the tradename SPEC-STAT®) was applied to the slat strip by passing the strip through a blade-type paint station according to the procedure described below. The primer was somewhat dark in color, but is translucent.

The blade-type paint station employs a paint pot in which the flat one inch (2.54 cm) wide aluminum strip is flooded with the primer paint. The strip is then pulled up through squeegee blades made of steel with a carbide top exit tip. One "female" blade is of a rotated 90° U-shape and the other "male" blade is a flat plate engaged and slidable on four posts extending from the female blade. Springs and wing nuts are affixed to threaded ends of the posts exterior of the male blade, which wing nuts are tightened to adjust the spacing between the blades so that the paint-flooded strip can pass therethrough with a clearance representative of the desired thickness of the wet primer coat namely of from about 0.001 inch to 0.0015 inch (0.03–0.04 mm). The respective blades are about 4" (10.2 cm) high and about 3" (7.6 cm) wide. Succeeding lengths of strips are joined by rivets and the spring-pressed male blade allows passage of the double-thickness of the riveted strip joint by spring action. Slat substrate feed rates of about 10 m/second were employed.

Upon exiting from the paint station, the primer coat of the primed slat substrate was cured by passing the moving strip through a curing furnace at a temperature of about 350° C. for about 15 seconds.

The anti-static conductive coating was applied to the moving strip through a second blade-type paint station as set forth above. The anti-static conductive coating, being pigmented, was opaque and was thicker than the primer coat. A white anti-static coating designated #116 (available from Specialty Coatings Company, Elk Grove Village, Ill. and sold under the tradename SPEC-STAT®) was used. A thickness of from about 0.08 mm to about 0.10 mm inches (3–4 mils) on the strip edges and strip top and bottom surfaces was provided.

EXAMPLE 2

The procedure of Example 1 was repeated using a gray anti-static coating designated FOG (available from Specialty Coatings Company, Elk Grove Village, Ill. and sold under the tradename SPEC-STAT®).

EXAMPLE 3

The procedure of Example 1 was repeated using a light rose anti-static coating designated Rosetta (available from Specialty Coatings Company, Elk Grove Village, Ill. and sold under the tradename SPEC-STAT®).

EXAMPLE 4

Blinds prepared as described in Example 1 were tested by the following methods. The blinds were coated with the primer designated 657-1-W-1158A. The numbers used in the examples and the supplier's (Specialty Coatings Company, Elk Grove Village, Ill.) designation and lot number are shown below. The tested coatings were all sold under the tradename SPEC-STAT®.

| LEVOLOR NUMBER | SPECIALTY CODE # | LOT NUMBER |
| --- | --- | --- |
| 7501 |  | 5134-92 |
| 7502 | 408-1-Y-623 | 6162-92 |
| 7503 | 408-1-W-1165 | 9261-92 |
| 7504 | 408-1-W-1163 | 5141-92 |
| 7505 | 408-1-W-1164 | 9261-92 |
| 7506 | 408-1-N-1389 | 5142-92 |
| 7507 | 408-1-R-392 | 6161-92 |
| 7508 | 408-1-R-393 | 9262-92 |
| 7509 | 408-1-4-391 | 5141-92 |
| 7510 | 408-1-G-319 | 5141-92 |
| 7511 | 408-1-G-321 | 5141-92 |
| 7512 | 408-1-B-379 | 5141-92 |
| 7513 | 408-1-B-373 | 5141-92 |
| 7514 | 408-1-R-391 | 5142-92 |
| 7515 | 408-1-C-561 | 5141-92 |
| 7516 | 408-1-C-562 | 5141-92 |
| 7517 | 408-1-K-416 | 5141-92 |
| PRIMER | 657-1-W-1158A | 8231-9 |

Test Methods

One method of measurement has been developed to determine the level of "dust resistance" of the slat products.

1. Direct particle counting by automatically analyzing 10× macro photographic images of the slat surfaces. Images are also counted by the naked eye manually.

Test Equipment
1. Kodak Carousel 4400 Projector
2. Nikon FM 35 mm Camera
3. Micro Nikon 55 mm f/2.8 Macro lens
4. Nikon Bellows Focusing Attachment PB-4
5. Kodak T Black and White Film—either 100 or 400 ASA
6. Keithly 614 Electrometer and HP 3612A Power Supply
7. Spectraguard C-645 Conductive Silver Acrylic Aerosol Coating
8. Konntron Image Analysis System
9. Monroe Electronics Model 262A Portable Surface Sensitivity Meter Blind Orientation 1. Hang 30"×36" test blinds in designated locations. A total of four blinds are used for the test. Three blinds contain the conductive coating formulation. One blind is the standard coating.

2. Slat Orientation—Within a 24-hour period the slats are placed in a vertical (closed) position for 12 hours and at an approximate 45 degree angle (open) position for 12 hours.

3. Within a full week period the blinds are raised and lowered on the fourth and seventh day.

4. Dust particle accumulation is measured at 7, 14, 21 and 28 days from the start of the test.

5. Several slats are cut off each of the four blinds in the relative same locations on the respective days. The slat pieces are approximately 6" in length.

Photographic Test Procedure

1. Illumination—The slats under examination are illuminated at "glancing incidence" on a table in a completely darkened room. A Kodak 4400 Projector is used as a collimating light source. Correct lighting is critical to obtaining a high contrast black and white image of contamination on the surface of the slats.

Precise glancing incidence, collimated parallel to the surface of the slat, achieves the objective of lighting only the dust resting on the surfaces, without enhancing the surface texture or being affected by variations in background color.

2. Photography—An exposure series is taken of each random area of the surface selected for observation by varying the light intensity by changing the shutter speed. Shutter speeds from 0.5 to 16 seconds are used depending on the film speed, dust accumulation and the lamp brightness.

Four to five areas are photographed on each test slat and the control. Negative magnification at the negative plane is 3.3×. Best focus is obtained at full aperture. The lens is then stopped down to f/8 for optimum image quality.

3. Printing—The film is processed for high contrast and printed as contact proof sheets. The best quality exposures are selected, then enlarged and printed. Each roll contains up to 38 exposures of which 8–10 are selected for printing. One frame is printed of each area of the surface photographed in the "exposure series" described above (Step 2). Print enlargements are 3×, the final image magnification is 10×. The magnification appears optimal—it is low enough to yield a wide field of view so that "average" surface characteristics are observed and high enough to render all particles of interest visible.

4. Particle Counting—Manual and Computer—Manual counting is done by moving a slit measuring approximately 8×80 mm across the photograph and counting the particles in the field of view. The entire photograph is scanned. The counts from each slit aperture are summed.

Automatic or computer counting is accomplished by first digitizing the high contrast black and white photograph using a video camera and analyzing the video image with computer software. This service is performed by an outside laboratory, Surface Science Laboratories, Inc. of Mountain View, Calif.

Test Results

1. Determination of the particle count relative to the control uses the following formula:

$$\frac{\text{Experiment (avg.)} - \text{Control(avg.)}}{\text{Control (avg.)}} \times 100 = \begin{array}{l}\text{Percentage}\\\text{Relative to}\\\text{the Control}\end{array}$$

The results of the test are described below.

Figure 1:
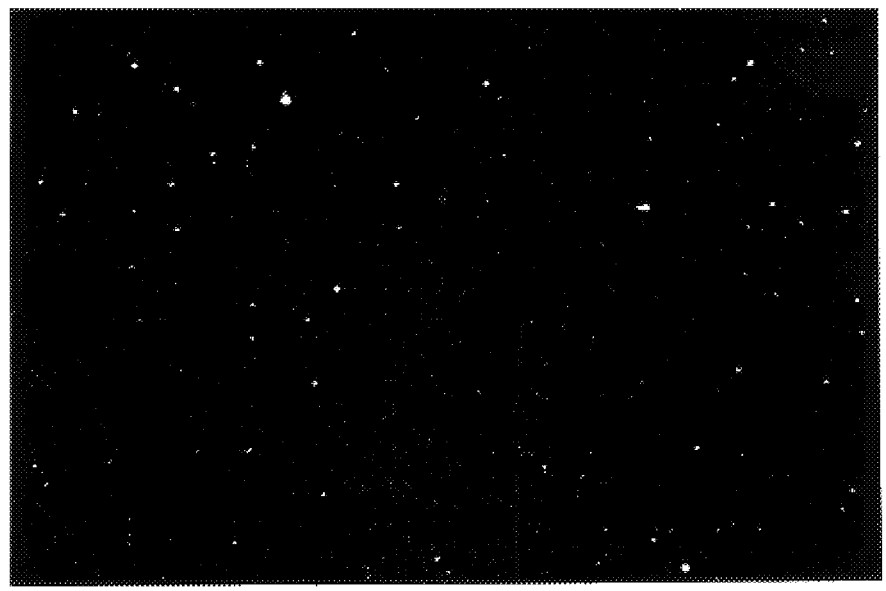
FIG. 1 is a microphotograph (10×) showing a distribution of dust particles on a conventional prior art color coated blind slat control portion following a seven-day test.
Figure 2:
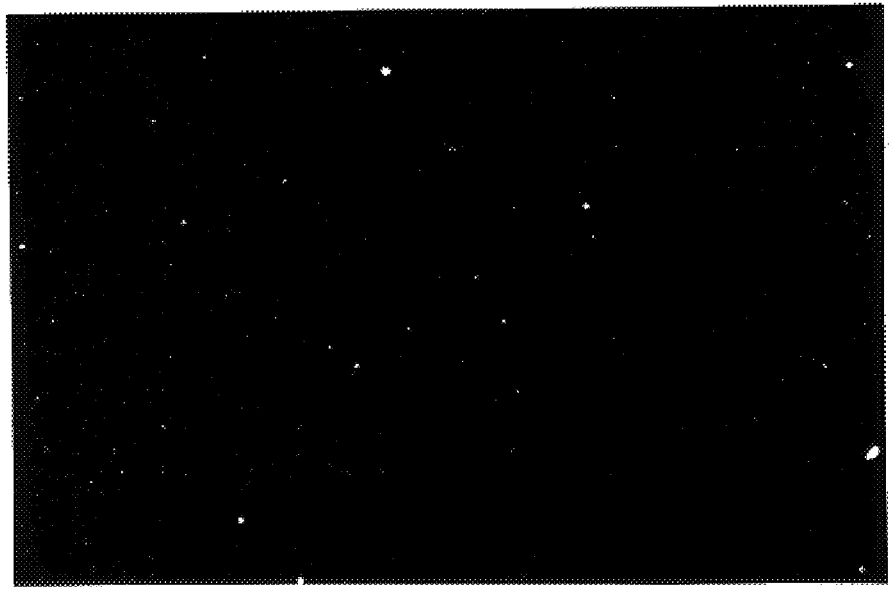
FIG. 2 is a microphotograph (10×) showing a distribution of dust particles on a slat portion coated in accord with the invention following a seven-day test.
Figure 3:
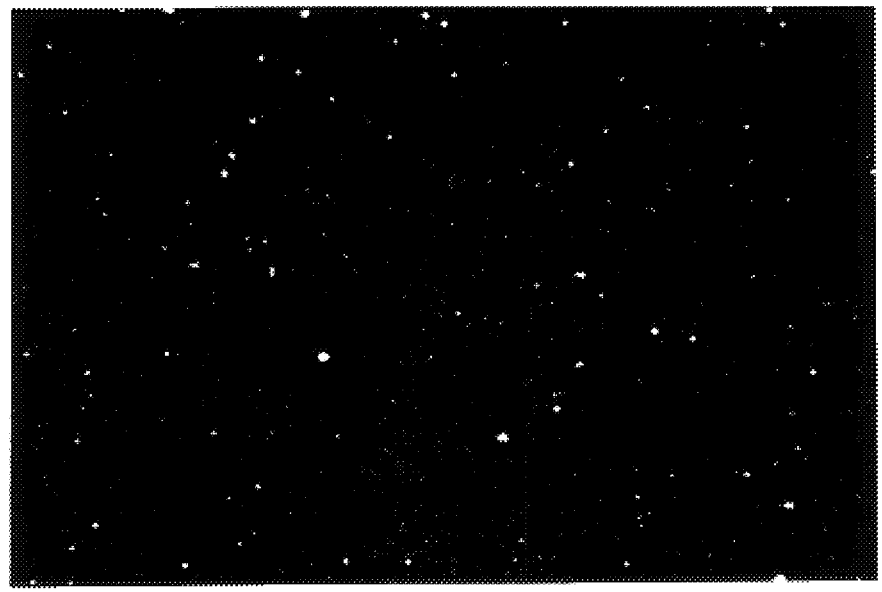
FIG. 3 is a microphotograph (10×) of dust distribution on a second prior art color coated blind slat control portion following a seven-day test.
Figure 4:
FIG. 4 is a microphotograph (10×) of dust distribution on a comparable slat portion coated in accord with the invention following a seven-day test.

FIG. 1 illustrates a 7-day duration test which shows a control using conventional slat paint. A particle count of 132 particles was apparent. FIG. 2 illustrates the same test with essentially the same color of slat but utilizing a conductive primer coat and anti-static conductive coating prepared in accord with the above Examples. A particle count of 69 particles and a resultant 47.7% reduction in dust accumulation was obtained. FIG. 3 shows another control slat portion having a particle count of 185 particles while FIG. 4 shows the same test utilizing a conductive primer coat and an anti-static conductive coating, the specimen having a 20 particle count, resulting in an 89% reduction of dust accumulation.

TABLE 1

| Finish # | Sample # | Current (μA) | Voltage (V) |
|---|---|---|---|
| 7501 | 1 | 445 | 20 |
| 7501 | 2 | 596 | 20 |
| 7502 | 1 | 379 | 20 |
| 7502 | 2 | 288 | 20 |
| 7503 | — | — | — |
| 7503 | — | — | — |
| 7504 | 1 | 920 | 10 |
| 7504 | 2 | 810 | 10 |
| 7505 | — | — | — |
| 7505 | — | — | — |
| 7506 | 1 | 79 | 20 |
| 7506 | 2 | 61 | 20 |
| 7507 | 1 | 81 | 20 |
| 7507 | 2 | 118 | 20 |
| 7508 | — | — | — |
| 7508 | — | — | — |
| 7509 | 1 | 1010 | 10 |

TABLE 1-continued

| Finish # | Sample # | Current (μA) | Voltage (V) |
|---|---|---|---|
| 7509 | 2 | 960 | 10 |
| 7510 | 1 | 97 | 0.1 |
| 7510 | 2 | 63 | 0.1 |
| 7511 | — | — | — |
| 7511 | — | — | — |
| 7512 | 1 | 839 | 0.1 |
| 7512 | 2 | 579 | 0.1 |
| 7513 | 1 | 510 | 0.1 |
| 7513 | 2 | 365 | 0.1 |
| 7514 | 1 | 62 | 0.1 |
| 7514 | 2 | 50 | 0.1 |
| 7515 | 1 | 409 | 1.0 |
| 7515 | 2 | 188 | 1.0 |
| 7516 | 1 | 246 | 0.1 |
| 7516 | 2 | 312 | 0.1 |
| 7517 | 1 | 1780 | 1.0 |
| 7517 | 2 | 203 | 0.1 |

Conductivity readings were made on the coatings made using the formulation of the above Examples. For various colors of coatings which approximate commercially acceptable blind colors, Table 1 sets forth various Finish (color) Numbers with current readings and voltages resultant from test runs on an actual slats produced on the paint line. Test samples were made by masking with tape all but ¾"×½" (1.9 cm×1.27 cm) areas of the surface spaced 3½" (8.89 cm) apart. Electrodes were formed by spraying a Spectraguard C-645 Conductive Silver Acrylic Aerosol coating (Carroll Coatings Co., Providence, R.I.) on the masked exposed areas of the surface. After the coating is dry (at least 24 hours) the sample is measured across the spaced electrodes using an HP3612A Power Supply (Hewlett Packard) and a Keithly 614 Electrometer, all connected in series by standard cabling.

2. The electrometer and the power supply should be turned "on" for at least one hour prior to their use to stabilize their electrical performance. The power supply should be connected to the circuit only during the measurement. After warm up, the electrometer and power supply should be calibrated by measuring the current flowing through a known resistance. Once the set-up has been verified, sample measurements may be made. Remove the known resistance from the circuit, then put the sample in its place.

The current reading should be less than 20 nanoamps for "control" samples on using this electrode geometry. The readings of conductive samples will vary from 10 microamps (see Table 1) to several milliamps. The sheet resistivity is calculated as follows:

$$R_s = \frac{V}{I} \cdot \frac{1}{4.5}$$

and V and I are known, calculate R using the new, lower voltage used on the specific sample.

Additional tests performed to measure coating durability and toughness show little or no adverse effect due to the addition of the conductive additives.

For test colors displayed in the Table, an average of a 61.3% reduction in dust accumulation on the slats tested utilizing the primer coat and anti-static conductive coating of the Examples, with a Standard Deviation of 13.6% with a maximum reduction of 82% and a minimum reduction of 36% was provided. It is believed from experiments to date that a threshold of a conductivity of about 50 nanoamps at 20 volts measured using the above described electrode placement results in satisfactory dust accumulation reductions. The threshold level of resistivity corresponding to these measured values, as calculated according to the aforementioned formula, is $8.9 \times 10^7$ ohms/square. Satisfactory results appear to have been achieved with coating conductivities up to 1780 microamps at 1.0 volts. Other tests as illustrated in FIG. 6 have indicated an average % reduction in dust accumulation of about 53% over a conductivity range of from about 50–500 microamps at 20 volts.

The above description of embodiments of this invention is intended to be illustrative and not limiting. Other embodiments of this invention will be obvious to those skilled in the art in view of the above disclosure.

We claim:

1. A Venetian blind slat comprising a slat substrate having peripheral exterior surfaces; and an anti-static conductive coating on said substrate, said anti-static conductive coating comprising a paint and sufficient inert, inorganic conductive filler to result in a surface resistivity for said slat of at most approximately $8.9 \times 10^7$ ohms per square, wherein a tendency of the resultant coated slat to attract and accumulate airborne dust particles is reduced as compared to a comparable blind lacking said anti-static conductive coating.

2. The blind slat of claim 1 wherein said slat substrate is aluminum.

3. The blind slat of claim 1 wherein said slat substrate is a plastic.

4. The blind slat of claim 3 wherein said plastic is polyvinylchloride.

5. The blind slat of claim 1 wherein said slat substrate is wood.

6. The blind slat of claim 1 wherein the resistivity of said anti-static conductive coating is less than about $10^5$ ohms per square.

7. The blind slat of claim 1 wherein as to a particular blind color a reduction of at least 35% in dust accumulation is achieved relative to a blind slat which does not include said anti-static conductive coating.

8. The blind slat of claim 1 further including a conductive primer coat on said surfaces under said anti-static conductive coating and wherein said conductive primer coat comprises a paint formulation and an inert, inorganic, conductive filler.

9. The blind slat of claim 8, wherein said primer coat filler is a tin oxide.

10. The blind slat of claim 8, wherein said primer coat filler is a zinc oxide.

11. The blind slat of claim 1 wherein the surface resistivity of said slat is less than $10^6$ ohms per square.

12. The blind slat of claim 1, wherein said inorganic conductive filler is a tin oxide.

13. The blind slat of claim 1, wherein said inorganic conductive filler is a zinc oxide.

14. A method for treating a coil of a window blind slat substrate comprising the steps of:

unwinding said substrate coil; and coating said substrate coil with an anti-static conductive coating, said conductive coating comprising a paint and sufficient inert, inorganic conductive filler to result in a surface resistivity for said substrate coil of at most approximately $8.9 \times 10^7$ ohms per square, wherein a tendency of the resultant coated substrate coil to attract and accumulate airborne dust particles is reduced as compared to a comparable blind lacking said anti-static conductive coating.

15. The method of claim 14 comprising an additional step of coating said substrate coil with a conductive primer coat prior to coating said substrate coil with the anti-static conductive coating.

16. The method of claim 15 in which said conductive primer coat comprises a paint formulation and an inert, inorganic, conductive filler.

17. The method of claim 14 wherein the surface resistivity of said slat is less than $10^6$ ohms per square.

18. An improved Venetian blind of the type including a headrail, a plurality of tiltable spaced horizontal slats having rout holes formed therein, a bottom rail and at least one draw cord coupled to the headrail and to the bottom rail and passing through the rout holes in the slats, wherein the improvement comprises:

an anti-static conductive coating extending on each slat in the plurality of slats, said anti-static conductive coating comprising a paint and sufficient inert, inorganic conductive filler to result in a surface resistivity for the slats of at most approximately $8.9 \times 10^7$ ohms per square, wherein a tendency of the slats to attract and accumulate airborne dust particles is reduced as compared to a comparable blind lacking said anti-static conductive coating.

19. The improved blind of claim 18, further including a conductive primer coat on the slats under the anti-static conductive coating and wherein the conductive primer coat comprises a paint formulation and an inert, inorganic, conductive filler.

20. The improved blind of claim 18 wherein the surface resistivity of the slats is less than $10^6$ ohms per square.

21. A Venetian blind slat comprising a slat substrate having peripheral exterior surfaces; and an anti-static conductive coating on said substrate, said anti-static conductive coating comprising a paint and sufficient inert, conductive filler to result in a surface resistivity for said slat of at most approximately $8.9 \times 10^7$ ohms per square to reduce the tendency of the resultant coated slat to attract and accumulate airborne dust particles when compared to a comparable blind lacking said anti-static conductive coating.

22. A method for treating a coil of a window blind slat substrate comprising the steps of:

unwinding said substrate coil; and coating said substrate coil with an anti-static conductive coating, said conductive coating comprising a paint and sufficient inert, conductive filler to result in a surface resistivity for said substrate coil of at most approximately $8.9 \times 10^7$ ohms per square to reduce the tendency of the resultant coated substrate coil to attract and accumulate airborne dust particles when compared to a comparable blind lacking said anti-static conductive coating.

23. An improved Venetian blind of the type including a headrail, a plurality of tiltable spaced horizontal slats having route holes formed therein, a bottom rail and at least one draw cord coupled to the headrail and to the bottom rail and passing through the rout holes in the slats, wherein the improvement comprises:

an anti-static conductive coating extending on each slat in the plurality of slats, said anti-static conductive coating comprising a paint and sufficient inert, conductive filler to reduce the tendency of the slats to attract and accumulate airborne dust particles when compared to a comparable blind lacking said anti-static conductive coating.

24. A Venetian blind slat comprising a slat substrate having peripheral exterior surfaces; and an anti-static conductive coating on said substrate, said anti-static conductive coating comprising a paint and sufficient inert, conductive filler to reduce the tendency of the resultant coated slat to attract and accumulate airborne dust particles by at least about 35% when compared to a comparable blind lacking said anti-static conductive coating.

* * * * *